(12) United States Patent
Sundberg

(10) Patent No.: US 7,611,891 B2
(45) Date of Patent: Nov. 3, 2009

(54) GARDEN COMPOSTER

(76) Inventor: Henric Sundberg, 5370 South Service Road, Burlington, Ontario (CA) L7L 5L1

( * ) Notice: Subject to any disclaimer, the term of this patent is extended or adjusted under 35 U.S.C. 154(b) by 360 days.

(21) Appl. No.: 11/790,925

(22) Filed: Apr. 30, 2007

(65) Prior Publication Data
US 2008/0268531 A1   Oct. 30, 2008

(51) Int. Cl.
C12M 1/00 (2006.01)
C12M 1/02 (2006.01)
C12M 1/10 (2006.01)

(52) U.S. Cl. ................................. 435/290.3; 435/290.1
(58) Field of Classification Search ............. 435/290.1, 435/290.3
See application file for complete search history.

(56) References Cited

U.S. PATENT DOCUMENTS 2,952,588 A * 9/1960 Rinderer ................... 435/298.2
5,843,769 A * 12/1998 Jonninen ................. 435/290.3
7,052,902 B2 * 5/2006 Miller ...................... 435/290.3

* cited by examiner

Primary Examiner—Walter D Griffin
Assistant Examiner—Lydia Edwards
(74) Attorney, Agent, or Firm—Gowling Lafleur Henderson, LLP

(57) ABSTRACT

A garden composter for decomposing garden waste in which the composter has a longitudinally extending cylindrical outer drum which is mounted to a support frame. Tumbling means are provided for coupling the drum to the support frame for rotation of the drum relative to the support frame about an axis of rotation of the drum. The drum has at least one load opening formed in a cylindrical wall portion for receiving organic waste into an outer chamber and a closure cap for selectively closing the load opening. An inner drum is fixed to the interior of the outer drum for rotation with the outer drum and has waste inlet means in communication with the outer chamber for receiving decomposing organic waste into an inner chamber before being discharged through a waste outlet. In this way, the garden composter can receive organic waste through the load opening for decomposition in the chambers and the waste can be aged in the inner chamber to prolong its residence time before being discharged from the composter.

8 Claims, 8 Drawing Sheets

US 7,611,891 B2

GARDEN COMPOSTER

FIELD OF INVENTION

This invention relates to a garden composter for household use. The composter is intended to be located outdoors where it may conveniently be loaded with organic plant material from a garden and which may be supplemented with vegetable waste from the kitchen for decomposition, optionally with organic accelerators, to provide compost material for use in the garden to enrich the soil and feed plants.

BACKGROUND OF THE INVENTION

For various reasons, gardeners will find it desirable to use composted organic material in their gardens. Conveniently, while supplementing the nutritional content of the soil, the gardener can take advantage of a composter to dispose of kitchen and garden waste in an ecological manner and exercise control over the nature of the fertilizers used in the garden. Such composting may be carried out simply by digging a hole in the garden and adding material to be decomposed to the hole. In order to create conditions which are favourable to decomposition, it is desirable for the composting hole to be covered so as to contain heat but also to provide access to the hole for regular mixing of the contents and for controlling moisture. Several container devices are known to provide such a controlled environment. The simplest form of such a container provides four side walls and a lid with bottom gates in the walls to access decomposed material at the bottom of the composter. In other cases, the container is closed and rotatably mounted in order to facilitate mixing of the contents as otherwise, this must be done manually, with the aid of garden tools.

Some tumbling composters are known in which the container is provided with a partition to divide the container into two compartments. An example of such a composter is described in U.S. Pat. No. 3,837,810. In another composter described in U.S. Pat. No. 5,589,388, the partition is movable in order to adjust the volume of the compartments. In both these composters, the dividing wall or partition is intended to separate the contents of one compartment from the other.

One of the problems associated with known composters is that there is limited opportunity for aging the organic waste in the respective compartments so as to prolong the residence time before discharge from the composter. Another problem which has been identified is the difficulty in removing decomposed material from the composter so that it can be used to supplement the soil in the garden and also provide more space in the composter to receive additional organic waste for further decomposition. It will be understood that it is desirable to always maintain a small portion of aged material in the composter which will have the necessary microbial mass to aid decomposition of fresh material added to the composter.

SUMMARY OF THE INVENTION

In accordance with this invention, there is provided a garden composter for decomposing garden waste in which the composter has an outer longitudinally extending cylindrical drum for mounting to a support frame. Tumbling means are provided for coupling the outer drum to the support frame for rotation of the outer drum relative to the support frame about a horizontal axis of rotation. The outer drum has at least one load opening formed in a cylindrical wall portion between two end wall portions for receiving organic waste material into an outer chamber and a closure for selectively closing the load opening. A longitudinally extending cylindrical inner drum is disposed inside the outer drum for rotation therewith about a common axis of rotation, the inner drum having waste inlet means in communication with the outer chamber for receiving decomposing organic waste into an inner chamber, and waste outlet means formed at one end of the inner drum for discharging decomposed waste through a discharge opening. The discharge opening is formed in an end wall portion of the cylindrical drum for discharging composted material and a closure cap is provided for selectively closing the discharge opening. In this way, the garden composter can receive waste through the load opening for decomposition in the chambers and the waste can be aged in the inner chamber to prolong its residence time before being discharged from the composter.

BRIEF DESCRIPTION OF THE DRAWINGS

In order that the invention may be better understood, a preferred embodiment is described below with reference to the accompanying drawings, in which.

DESCRIPTION OF THE PREFERRED EMBODIMENT

Figure 2B:
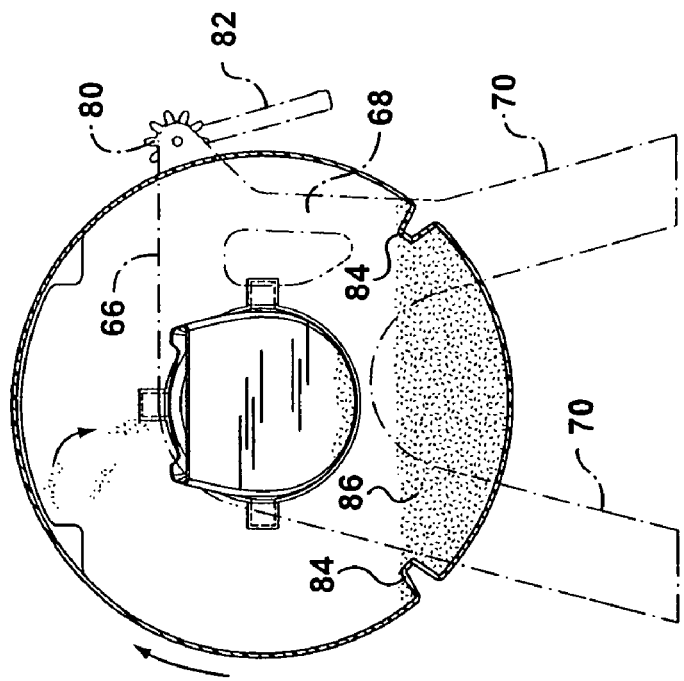
FIG. 2B is a cross-sectional view of the garden composter drawn on lines 2B-2B of FIG. 2A.
Figure 2A:
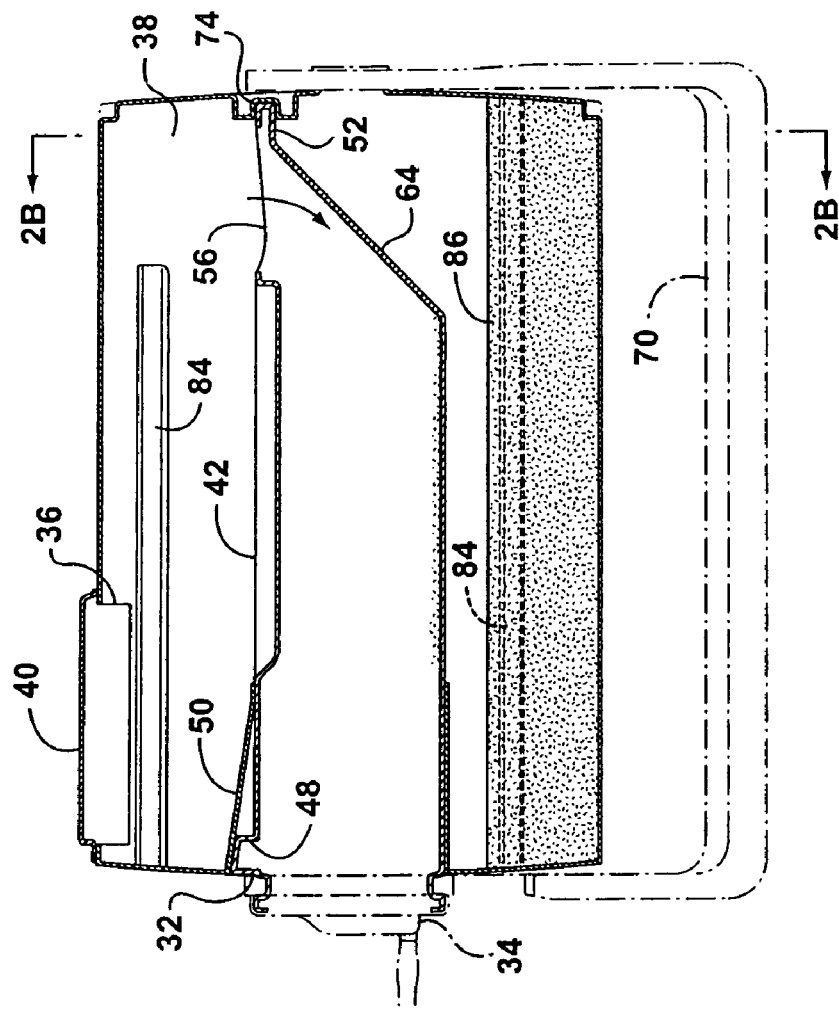
FIG. 2A is a side view of the garden composter of FIG. 1 drawn in cross-section with the support frame in ghost outline.

A composter according to the invention is generally indicated in the accompanying drawings by reference numeral 20. The composter 20 has an outer longitudinally extending cylindrical drum 22 which has a cylindrical side wall portion 24. The cylindrical side wall portion 24 extends between two end wall portions 26, 28 about a longitudinal axis 30. The end wall portion 26 is closed while the end wall portion 28 defines a discharge opening 32 through which composted material may be discharged from the composter 20. Conveniently, a threaded closure cap 34 (shown in chain-dotted outline in FIG. 2A) is provided for selectively closing the discharge opening.

The outer drum 22 also has a side load opening 36 formed in the cylindrical wall portion 24 and disposed at one end of the outer drum for receiving organic waste material into an outer chamber 38. The load opening 36 is selectively closed by a slidable closure 40. Preferably the load opening 36 is formed at the same end of the outer drum as the discharge opening 32.

Figure 1A:
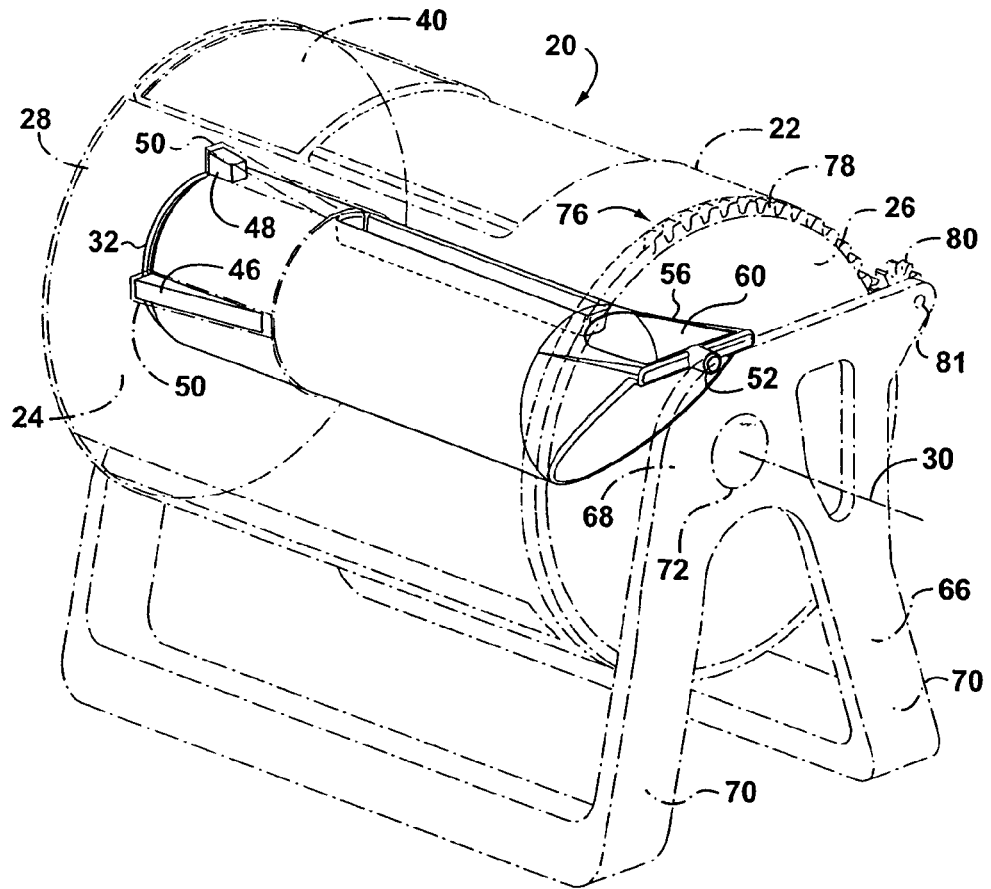
FIG. 1A is a perspective view of the garden composter made in accordance with the invention showing an outer drum and a support frame drawn in ghost outline, and an inner drum drawn in solid lines.
Figure 1B:
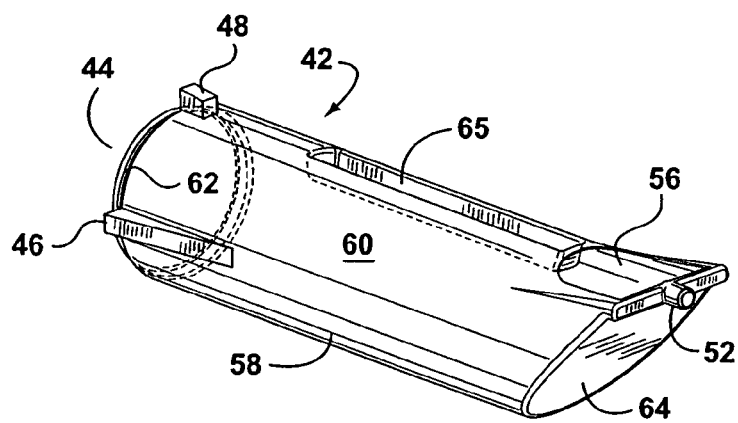
FIG. 1B is a similar view to FIG. 1A showing the inner drum without any surrounding structure.
Figure 3B:
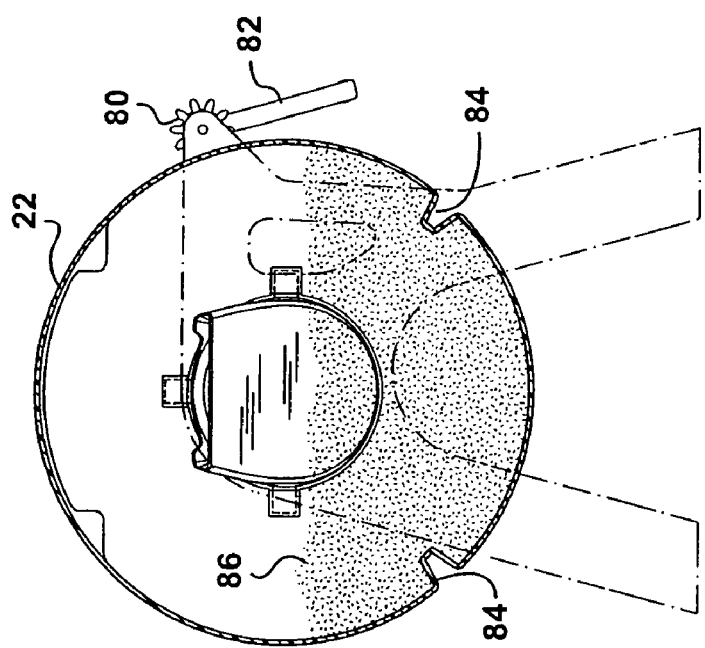
FIG. 3B is a cross-sectional view of the garden composter drum drawn on lines 3B-3B of FIG. 3A.
Figure 3A:
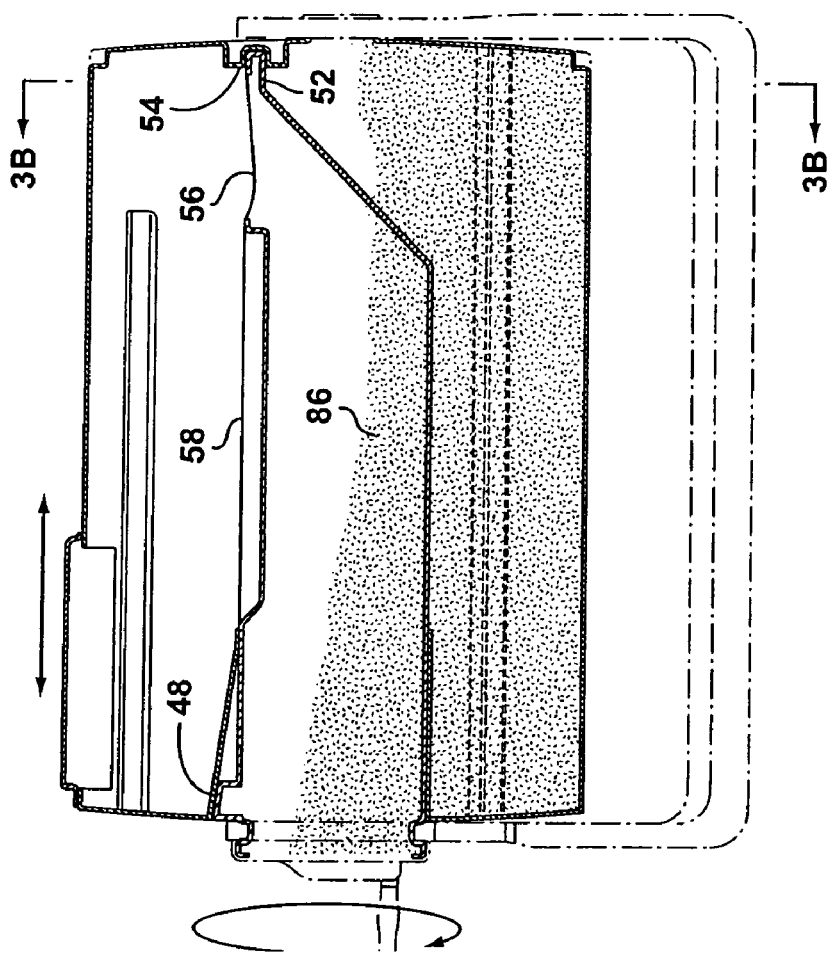
FIG. 3A is a similar view to FIG. 2A with a greater waste load in both the outer and inner drum.
Figure 3D:
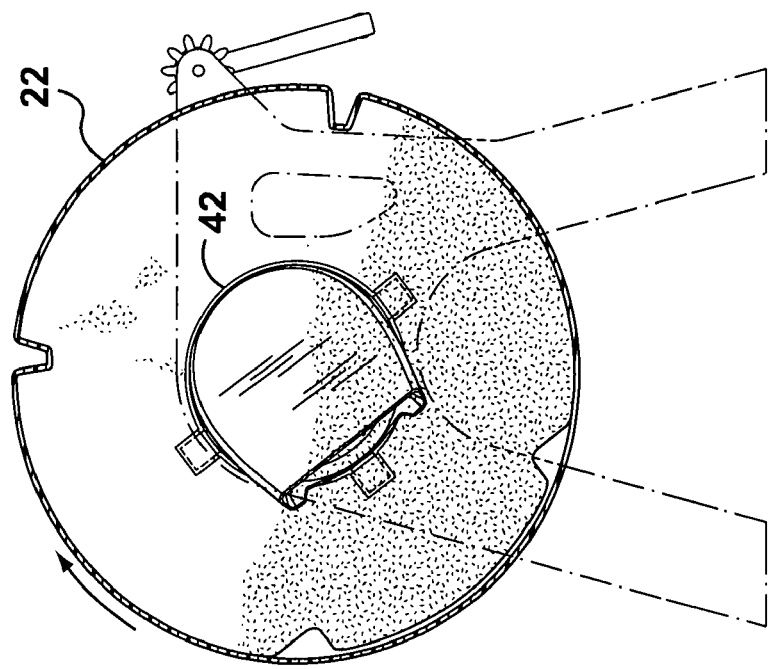
FIG. 3D is a cross-sectional view similar to FIG. 3C with the composter rotated clockwise and a waste inlet means to the inner drum immersed in decomposing waste.
Figure 3C:
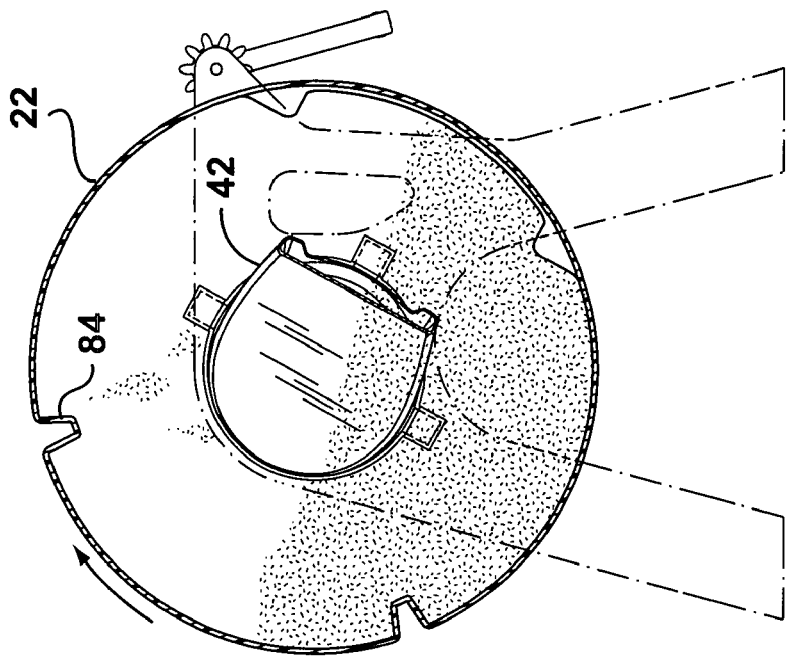
FIG. 3C is a cross-sectional view similar to FIG. 3B with the composter rotated clockwise, and a waste inlet means to the inner drum partially immersed in decomposing waste.
Figure 3E:
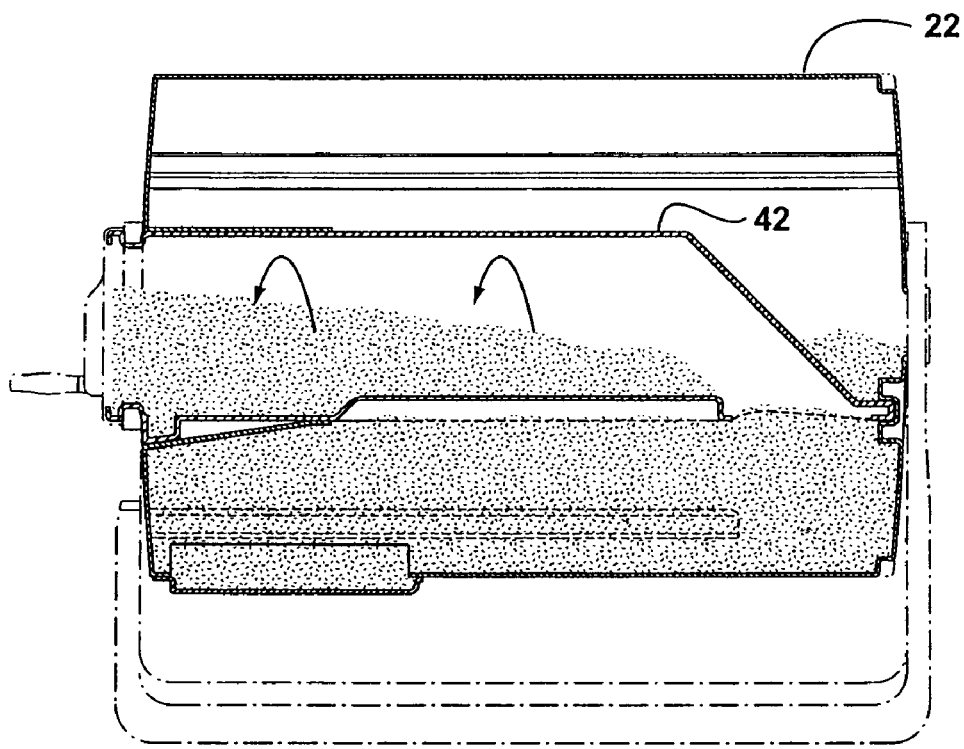
FIG. 3E is a cross-sectional view similar to FIG. 3A with the composter rotated 180° and a waste inlet means to the inner drum facing downwardly.
Figure 3F:
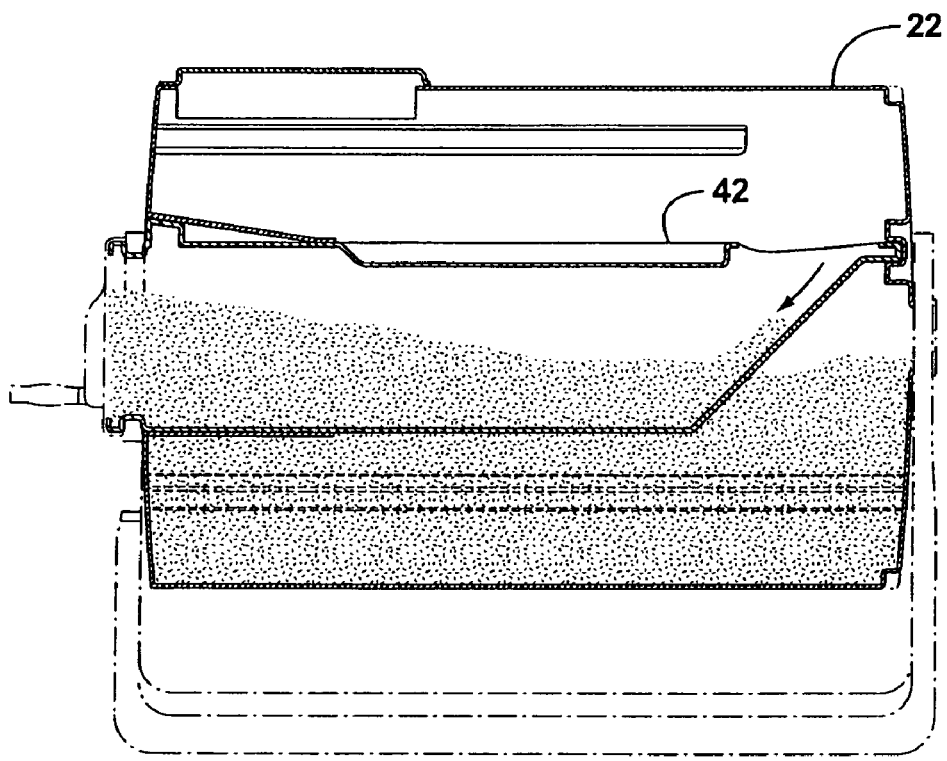
FIG. 3F is a cross-sectional view similar to FIG. 3E with the composter rotated 180° and a waste inlet means to the inner drum facing upwardly.

A longitudinally extending cylindrical inner drum 42 (FIG. 1B) is disposed inside the outer drum 22 for rotation with the outer drum about the longitudinal axis 30. The inner drum 42 has a first end 44 supported in the discharge opening 32 of the outer drum and is fixed to the outer drum by means of two radially spaced trigonal shaped lugs 46 and a block 48 received in corresponding recesses 50. The other end of the inner drum 42 has an outwardly extending boss 52 received in a recess 54 (FIG. 3A) to couple the inner drum 42 to the outer drum 22 and thereby support the inner drum during rotation of the composter 20 about the common axis of rotation.

The inner drum 42 has an opening 56 formed in a cylindrical side wall 58 at the end of the inner drum 42 remote from the first end 44. The opening 56 defines waste inlet means in communication with the outer chamber 38 for receiving decomposing organic waste into an inner chamber 60. Waste outlet means for the inner drum are defined by an open end wall 62 of the inner drum remote from the waste inlet opening 56.

A sloped end wall 64 formed opposite from the waste inlet opening 56 is adapted to direct incoming decomposing waste toward the waste outlet in the open end wall 62.

A single rib 65 is formed on the interior surface of the inner drum 42 to assist in lifting waste as the drum rotates.

Returning to FIG. 1A, it will be seen that the drum 22 is rotatably supported by a frame 66 so as to be spaced from a supporting surface such as grass. The frame 66 comprises of a bearing plate 68 disposed for location against the closed end wall portion 26 at one end of the drum 22 and a pair of converging leg members 70 that extend downwardly and along the length of the drum to form a cradle. The bearing plate 68 has an opening 72 dimensioned to receive a respective trunnion 74 (FIG. 2A) and to support the drum 22 in sliding engagement with the trunnion 74. The opposite end of the drum 22 is also supported by the frame 66 so as to be rotatable relative thereto as will be readily apparent to a person skilled in the art.

Tumbling means 76 are provided for coupling the drum 22 to the support frame 66 for rotation of the drum relative to the support frame about the longitudinal axis 30. In the embodiment illustrated, the tumbling means comprises a toothed peripheral rim 78 formed on the closed end wall 26 of the drum 22 and cooperating with a pinion wheel 80 at one end of a pinion shaft 81 which is rotatably mounted to the support frame 66. A handle 82 is provided at one end of the pinion shaft 81 to facilitate rotation thereof and to allow the pinion wheel 80 to engage the toothed peripheral rim 78 for rotation of the drum 22. Alternatively of course, the drum 22 may simply be rotated by direct manual contact.

Figure 4:
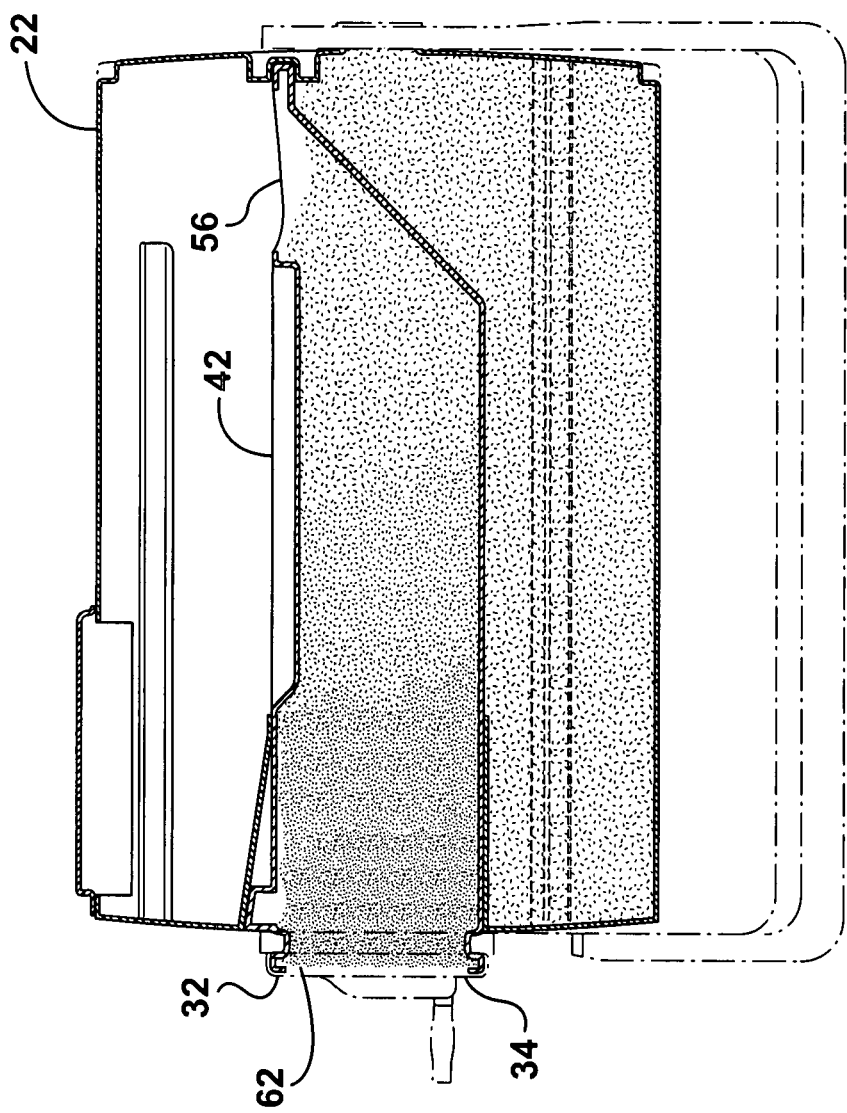
FIG. 4 is a cross-sectional view similar to FIG. 3A with the inner drum filled to capacity.

A pair of ribs 84 are formed on the interior surface of the outer drum 22 to assist in lifting waste as the drum rotates. When a predetermined volume of waste has accumulated in the outer drum 22 as illustrated by FIGS. 3A-3F continued rotation of the outer drum 22 will cause such waste to enter the inner drum 42 through the waste inlet opening 56. The quantity of waste which is admitted to the inner drum from the outer drum is, in part, determined by the relative position and dimensions of the inner drum to the outer drum. Eventually, the inner drum 42 will fill with waste material and the waste will compress at the discharge opening 32 as illustrated by FIG. 4.

Figure 5:
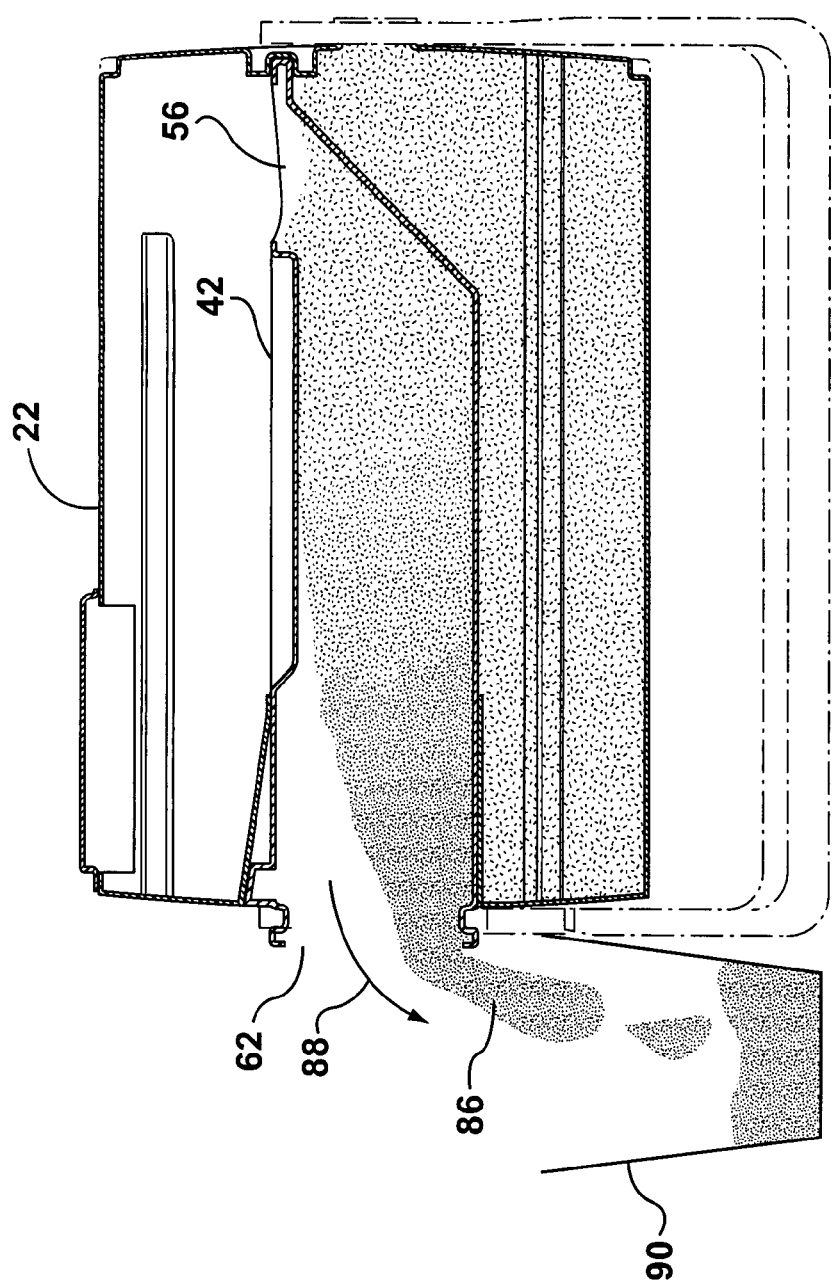
FIG. 5 is a cross-sectional view similar to FIG. 4 with a closure cap for a discharge opening to the outer drum removed to allow decomposed waste to discharge through a waste outlet formed in the inner drum.
Figure 6:
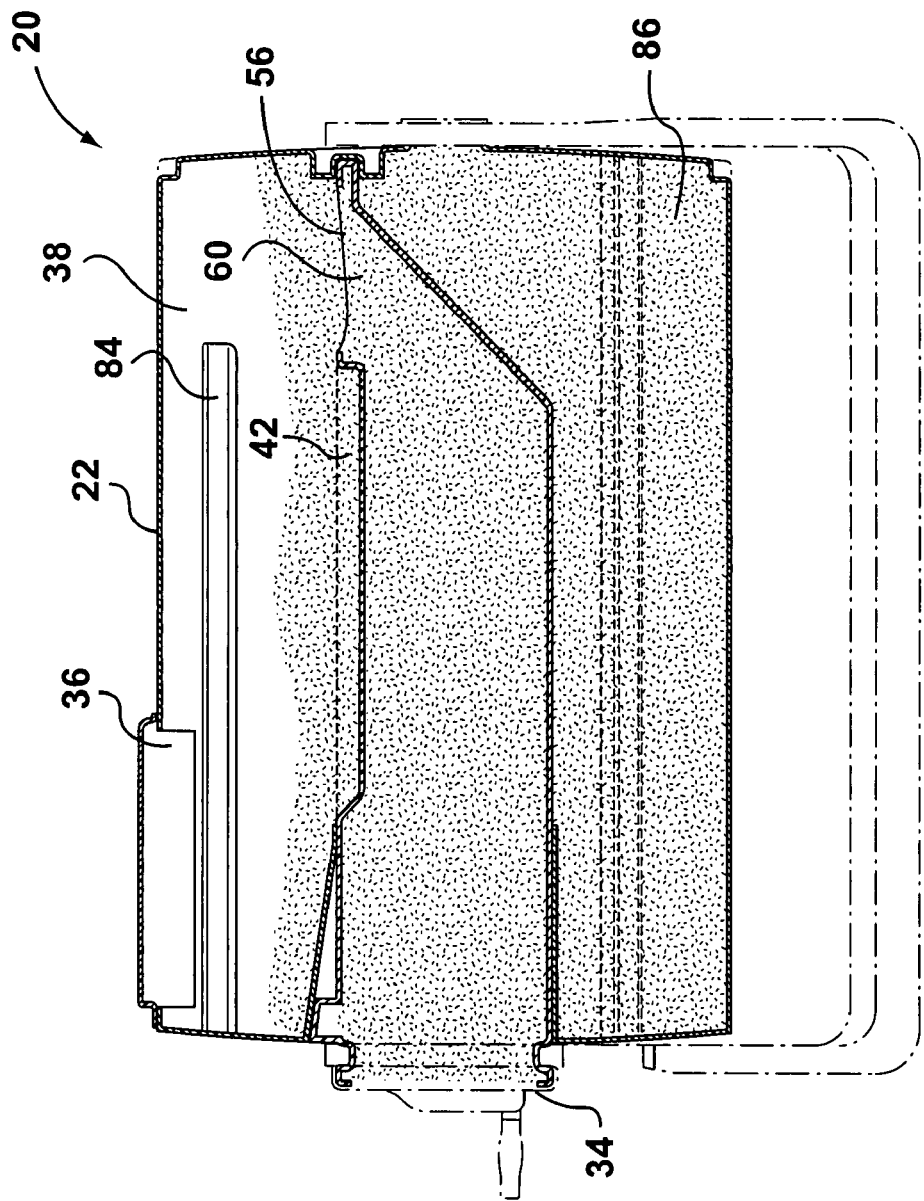
FIG. 6 is a cross-sectional view similar to FIG. 2A with a much greater waste load exceeding the capacity of the inner drum.

Rotation of the outer drum 22 causes the inner drum 42 to rotate with it and to thereby move any decomposing waste indicated by reference numeral 86 so that it exits through waste outlet means in the open end wall 62 when the closure cap 34 is removed as illustrated by FIG. 5. Excess liquid drains through liquid outlet means (not shown) formed in the outer cylindrical wall in a manner which will be readily to a person skilled in the art. If the closure cap 34 is left in place, waste material will simply accumulate in both the inner chamber 60 and the outer chamber 38 as shown in FIG. 6.

The flow of waste material thus proceeds from the load opening 36 into the outer drum 22. The waste 86 settles at the bottom of the outer drum 22 where excess liquid is drained. During rotation of the composter 20, some waste is carried by the ribs 84 and allowed to drop by gravity into the outer chamber 38. Some of this waste will also find its way into the waste inlet opening 56 of the inner drum 42. When the volume of waste material reaches the height of the inner drum 42, a significant proportion of the waste has been in residence in the outer drum 22 for a sufficient length of time to begin decomposition. It will be understood that heavier waste which requires a longer residence time to decompose travels more slowly through the composter while lighter waste material, which generally requires a shorter residence time travels more quickly through the composter.

An overflow of such decomposed waste material is scooped into the waste inlet opening 56 of the inner drum 42 where the residence time is still further prolonged until the waste exits as indicated by directional arrow 88 (FIG. 5).

It will be appreciated that the configuration of the outer drum 22 with the inner drum 42 disposed inside, allows for a two-stage decomposition of waste matter, thereby aging the waste in the inner chamber 60 to prolong its residence time before discharge from the composter 20 and creating a continuous composting process rather than a batch process.

By providing the discharge opening in the end wall, the discharge of composted material 86 occurs at the longitudinal axis of the drum and is significantly higher above the ground than the discharge opening would be if material were leaving through the load opening 36. Of course, the difference in height will be determined by the diameter of the drum and this will be a design consideration so that the discharge height will conveniently accommodate a wheel barrow or other container 90 for receiving decomposed material.

This configuration allows the discharge of compost material to be high enough above ground to fall into a wheel barrow for convenient removal and distribution in the garden while providing a convenient loading height for fresh material being added to the composter.

It will be understood that several variations, as will be apparent to those skilled in the art, may be made to the above described embodiment of the invention within the scope of the appended claims.

The invention claimed is:

1. A garden composter for decomposing organic waste, the garden composter having an outer longitudinally extending cylindrical drum for mounting to a support frame adapted to space the outer drum from a supporting surface, tumbling means for coupling the outer drum to the support frame for rotation of the outer drum relative to the support frame about an axis of rotation of the outer drum, the outer drum having at least one load opening formed in a cylindrical wall portion thereof for receiving organic waste into an outer chamber and a closure for selectively closing said load opening;

a discharge opening formed in one said end wall portions and a closure cap for selectively closing said discharge opening; and a longitudinally extending cylindrical inner drum disposed inside the outer drum for rotation therewith about a common axis of rotation, the inner drum having waste inlet means in communication with the outer chamber for receiving decomposing organic waste into an inner chamber, and waste outlet means formed at one end of the inner drum for discharging decomposed waste through said discharge opening;

whereby the garden composter may receive organic waste through said load opening for decomposition in said chambers, and the waste may be aged in said inner chamber to prolong its residence time before discharge from the composter.

2. A garden composter according to claim 1 in which the waste inlet means of the inner drum is formed in a cylindrical side wall at one end thereof remote from the waste outlet means.

3. A garden composter according to claim 2 in which the inner drum has a sloped end wall formed opposite from the waste inlet means to direct incoming decomposing waste toward the waste outlet means.

4. A garden composter according to claim 1 in which the waste outlet means of the inner drum is formed in an open end wall of the inner drum.

5. A garden composter according to claim 1 in which the outer drum comprises a cylindrical side wall, a closed end wall, and an open end wall opposite from said closed end wall defining said discharge opening, the inner drum having one end supported in said discharge opening.

6. A garden composter according to claim 1 in which the closed end wall of the outer drum is deformed to define a recess for receiving a boss formed in the inner drum, the boss being adapted to support the inner drum during rotation of the composter.

7. A garden composter according to claim 1 in which the load opening to the outer drum is disposed remotely from the waste inlet means to the inner drum.

8. A garden composter according to claim 1 in which the tumbling means comprises a toothed peripheral rim formed at one end of the composting drum for cooperation with a pinion wheel mounted to said support frame.

\* \* \* \* \*